United States Patent
Weinstock et al.

(10) Patent No.: US 12,055,731 B2
(45) Date of Patent: Aug. 6, 2024

(54) CROSSTALK BARRIER IN A LENS ARRAY

(71) Applicant: Soliddd Corp., Brooklyn, NY (US)

(72) Inventors: Neal Weinstock, Brooklyn, NY (US); Richard A. Muller, Berkeley, CA (US)

(73) Assignee: SOLIDDD CORP., Brooklyn, NY (US)

( * ) Notice: Subject to any disclaimer, the term of this patent is extended or adjusted under 35 U.S.C. 154(b) by 690 days.

(21) Appl. No.: 17/186,374

(22) Filed: Feb. 26, 2021

(65) Prior Publication Data
US 2022/0276412 A1 Sep. 1, 2022

(51) Int. Cl.
*G02B 3/00* (2006.01)

(52) U.S. Cl.
CPC ........... *G02B 3/005* (2013.01); *G02B 3/0075* (2013.01)

(58) Field of Classification Search
CPC ..... G02B 3/005; G02B 3/0075; G02B 3/0006
See application file for complete search history.

(56) References Cited

U.S. PATENT DOCUMENTS

| | | |
|---|---|---|
| 2013/0003184 A1 | 1/2013 | Duparre |
| 2013/0033636 A1 | 2/2013 | Pitts et al. |
| 2018/0076246 A1* | 3/2018 | Chen ................. H01L 27/14623 |
| 2019/0080138 A1 | 3/2019 | Gao et al. |

FOREIGN PATENT DOCUMENTS

JP 2001264513 A 9/2001

OTHER PUBLICATIONS

International Search Report for PCT Application No. PCT/US2022/017973, Jun. 20, 2022, 4 pages.

\* cited by examiner

*Primary Examiner* — James C. Jones
(74) *Attorney, Agent, or Firm* — FERENCE & ASSOCIATES LLC

(57) ABSTRACT

An apparatus, including: a plurality of lens tiles; and a base housing and positioning the plurality of lens tiles in an array configuration; the base comprising a plurality of light-occluding barriers, wherein each of the plurality of light-occluding barriers is located between two adjacent of the plurality of lens tiles. Other embodiments are described herein.

20 Claims, 3 Drawing Sheets

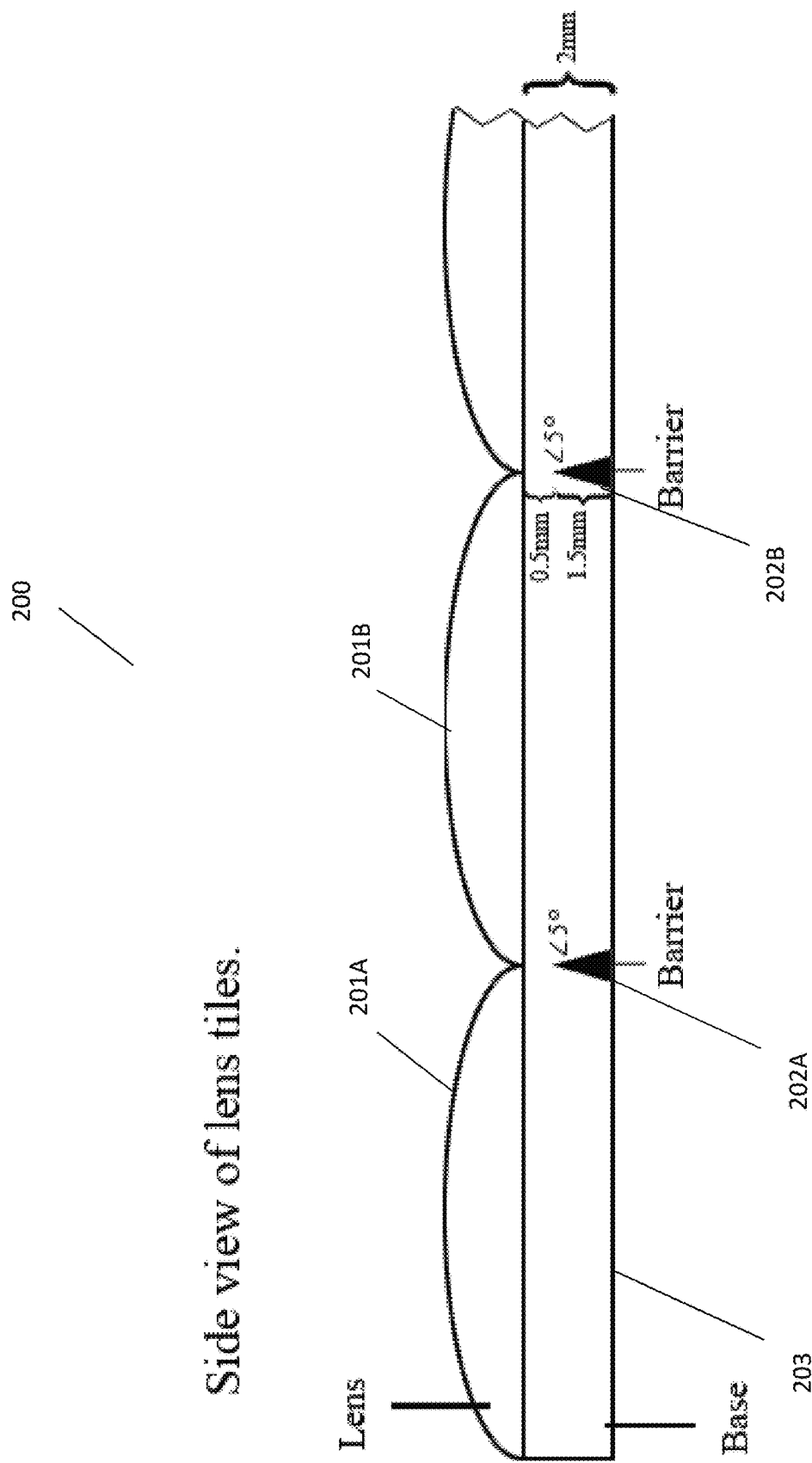

CROSSTALK BARRIER IN A LENS ARRAY

FIELD OF THE INVENTION

The present invention relates generally to an image viewing or capture system utilizing a lens made up of a plurality of lenslets in an array, which negates crosstalk present between lenses.

BACKGROUND OF THE INVENTION

Virtually all digital cameras and many kinds of displays employ a multiple lens array in front of the sensor (in a camera) or the display (in a monitor, television, smartphone, near-eye headset, or other kind of display device). The multiple lenses, whether a mini- or micro-lens array, a lenticular array, or other arrangement, often focus light on a larger area of the sensor, or focus that light emitted from a display, to or from a larger area of the sensor or display than that corresponding to the size of each lens in the array. For example, an array of mini-lenses in tiles measuring 2 mm square, and focusing on a sensor or a display located behind the lens array, may inevitably focus on areas of the display measuring 2.1 mm, or 2.2 mm, etc. This will create crosstalk—i.e., doubled images—in those overlapping areas in which more than one lens tile focuses on an area of the display or sensor. In conventional systems, this crosstalk issue may be typically overcome by darkening areas of the display or sensor in which double images would otherwise be present, or by more complex software to correct the images.

SUMMARY OF THE INVENTION

The present invention is a novel way of limiting or eradicating this image crosstalk. It also is a novel way of limiting the common chromatic aberration that appears at the edges of spherical and some other lens designs.

In accordance with the present invention, a system provides a camera or display device that includes a lens array panel made of a plurality of lens tiles. Crosstalk normally would occur at the edges of each lens in the array, also referred to herein as lens tiles or lenslets, causing double images (e.g., seeing parts of two neighboring lens tiles' images overlapping). The muddy resulting double-image may appear to simply be out of focus or appear as chromatic aberration, depending on multiple other factors. Additional chromatic aberration is also commonly present towards the edges of lenses.

Crosstalk is present at many viewings or capture distances, and at many possible distances from the lens array to the display or sensor; however, the longer the focal distance from a user's eyes to the displayed image through a lens array, the less crosstalk will be seen. Similarly, the farther the focal distance that an object may be from the lens array and a sensor, the less crosstalk will be captured. Also, the longer the focal distance from the lens array to either the sensor or the display, the less crosstalk will be seen. Thus, the crosstalk problem is most acute for close-focusing cameras, near-eye displays, and for multi-tile lens arrays focusing very closely at displays or sensors.

The present invention solves this problem, and also solves the problem of chromatic aberration towards the edges of spherical and other lens designs by limiting the field of view of each lens tile in the array; it does this by creating barriers to light at the edges of each image tile in the array. If the position of a given lens tile array vis-a-vis the viewer, or the focused-upon object, and the underlying display or sensor, is such that there is an X percent overlap of images at the edge of each lens tile, then the optimal solution would be a dark barrier between each lens tile occluding the view of the same X percent of the edge-adjacent area of each lens tile's image.

Said barrier should be as dark as possible and as unreflective as possible. In case some light is passed through or reflected, its index of refraction should closely match that of the usable and transparent portions of the lens.

In summary, one aspect provides an apparatus, comprising: a plurality of lens tiles arranged as a flat-panel lens array, wherein the plurality of lens tiles are arranged in an array having a first dimension and a second dimension; a lens base upon which the array resides, wherein this base comprises positioning the plurality of lens tiles adjacent to one another; wherein the base comprising the plurality of lens tiles features a plurality of barriers present between each edge of the plurality of lens tiles.

A BRIEF DESCRIPTION OF THE DRAWINGS

FIG. 2 illustrates an example embodiment of the apparatus containing barriers.

DETAILED DESCRIPTION OF THE INVENTION

Figure 1:
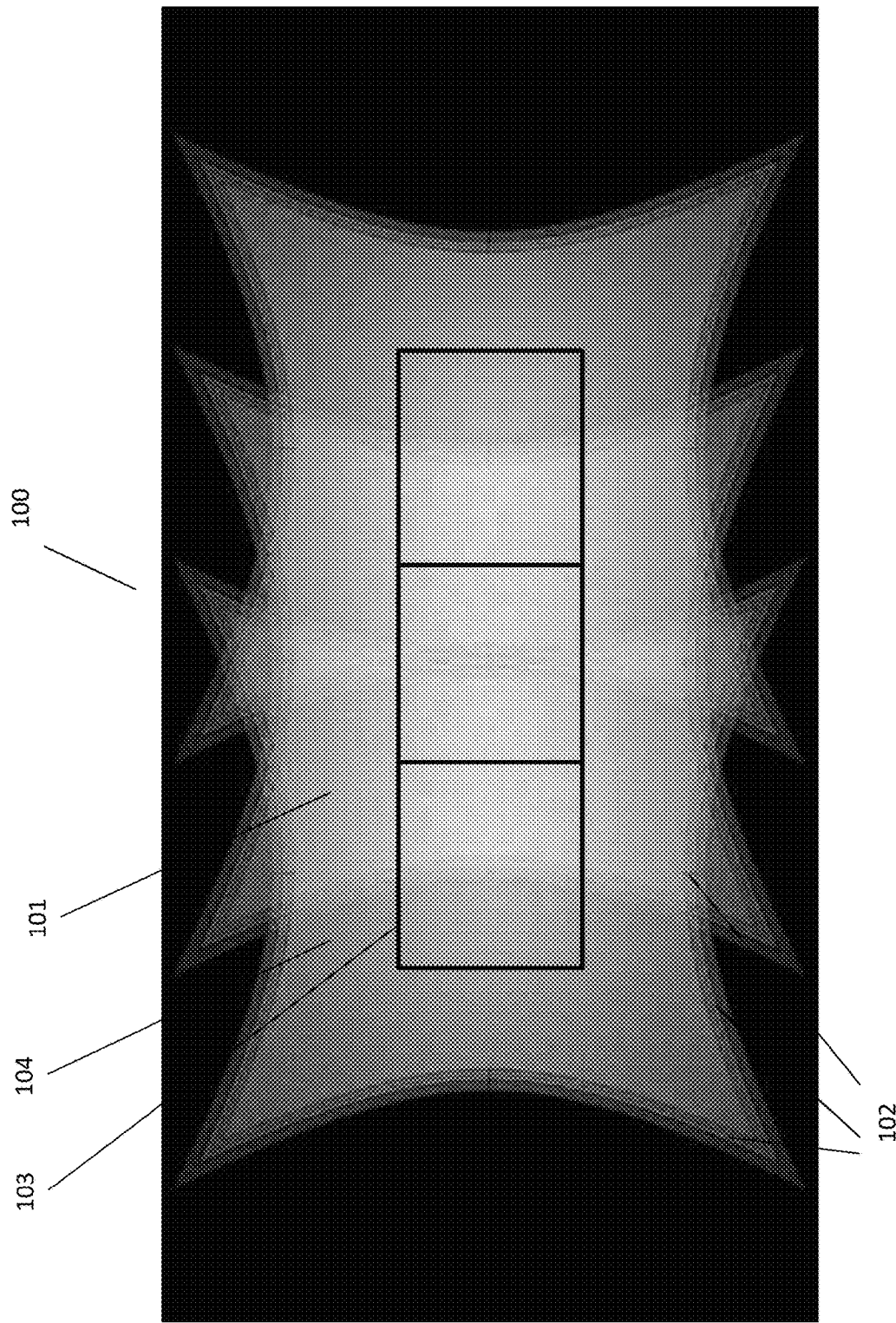
FIG. 1 illustrates an example of lenticular crosstalk in a pincushion shape.

In accordance with the present invention, an embodiment provides a plurality of lens tiles; and a base housing and positioning the plurality of lens tiles in an array configuration; the base comprising a plurality of light-occluding barriers, wherein each of the plurality of light-occluding barriers is located between two adjacent of the plurality of lens tiles. In other words, an embodiment provides a lens array present on a base containing a plurality of barriers, each one of the plurality of barriers present at the edges of each lens tile in the lens array, which allows a user to view an image through the lens array from an underlying display or to capture an image through the lens array with an underlying sensor, without crosstalk between neighboring images seen through the multiplicity of lens tiles in the array. Clarity of an image being captured or viewed through an apparatus is provided back to the user.

The lens array is made up of a plurality of lens tiles, also referred to as microlenses, mini-lenses, lenticular lenses or lenslets. The lens array may be part of a plenoptic camera or display system, a light-field camera or display system, a 3D or volumetric system, a light projector, or various other optical systems. Each lens tile is associated with an area of an underlying display or sensor, and is positioned adjacent to neighboring lens tiles. In an embodiment, the adjacent lens tiles may be oriented such that they have the edge of each neighboring lens tile touching, and permit the capture or viewing of images through the multiple tiles simultaneously. In an embodiment, the lens tiles used in the array may be of any shape. Image crosstalk is more or less present at the edge of any shape lens tile in the array, depending on viewing distance and focal distance to the underlying display, when the lens is used in a display device, and depending on focal distance to a captured object and to the underlying sensor, when the lens is used in a camera device. Throughout this description of the invention, the primary shape of the lens tiles may be a square shape, but it is important to know that this is a non-limiting example. Further, in an embodiment, the use of the square lens tiles may be arranged such that the edges of each square tile are touching a neighboring square tile. In an embodiment, the size of all square lens tiles may be equal. Equal size lenses may further permit the matching of edges when arranging the lens tiles in an orientation used by any application for such a mini-lens, microlens, lenticular lens or other similar lens array. Rectangular lens shapes, across the array, may facilitate the cutting or molding of, and packing of light-blocking material into, a set of troughs aligned with said lenses.

When utilizing neighboring square tiles in a viewing system, the amount of image crosstalk that is present at a close viewing distance is far greater than that being viewed from a farther viewing distance. In an embodiment, the use of a tiled lens array when being viewed at a long distance (e.g., electronic billboard or projected motion picture image) may not present any observable crosstalk present between lenses, because a user's angle of view, from one side of a tile to the next, approaches approximation of parallel lines from the eye to the lens edges. For example, if the distance from the eye to the lens array is 100 meters, and the distance from the lens array to the underlying display is 1 mm, and if the lens is spherical and focused on the surface of the display with no other lens elements between eye and lens, and lens and display, then the field of view from eye to display will be only a tiny amount larger than that from eye to lens, such as to be unnoticeable. Alternatively, in an embodiment, when a viewer's eye may be only 10 mm from the lens array, and the lens array is just 1 mm from the underlying display— or even more so, when the eye may be only 10 mm from the lens array and the lens array is 10 mm from the display—(for two of an infinite number of examples) then there will be larger differences between the field of view from eye to lens and from eye to display, causing very noticeable crosstalk among neighboring images seen through the lens array. Such a short viewing distance will also allow the eye to better see chromatic aberrations which may be present towards the edge of the viewing zone of each lens in the array.

As mentioned previously, the lens tiles of the lens array may be arranged such that the edges of neighboring lens tiles are located adjacent to one another. Using the example of square tiles, the lens tiles may be arranged in a matrix or other array form consisting of a first and second dimension. In an embodiment, depending on the overall size of the desired lens array application, the lens tiles present may be arranged in a matrix orientation. For example, a plenoptic lens array may be arranged in a 2×2 matrix orientation. A 2×2 matrix follows traditional matrix orientation, containing four lens tiles next to one another arranged into one overall rectangle. In an embodiment, all of the inner edges, or the adjacent edges, may be touching one another, creating an overall larger square. Such a matrix may be extended to any number of tiles per side of the overall rectangular array, and indeed, the array of rectangular tiles may be bounded by an overall circle or other two-dimensional geometric shape as may be required for different applications, for example, in an embodiment such as a microlens array fitting over a sensor in a camera or projector, on which a typical multi-element camera or projection lens is focused onto the microlens array. In an embodiment, lens tiles that are adjacent to one another may be in an irregular or asymmetric arrangement, or only a bilaterally symmetrical arrangement. In other embodiments, the lens tiles in the array may be each of different shapes, such as circles, octagons, hexagons, or the like. Shapes may be chosen based on desired applications including the multiple possible arrangements of underlying display pixels or sensor photosites, or of the multiple possible arrangements of optical elements placed in front of the lens array. The overall shape may also be based upon the shape of the lens tiles, for example, if the lens tiles are shaped as octagons the overall shape may be a larger octagon-like shape. The lens array may also be used alone as a single optical element, for example in a single element array as taught in U.S. patent application Ser. No. 16/712,425 filed on Dec. 12, 2019, or, in other embodiments, may be stacked in a multi-element array as will be familiar with those versed in the art of optical design. The areas of adjacency, or near adjacency, between lens tiles is the locus where image crosstalk occurs.

Referring to FIG. 1, image 100 shows the presence of both image crosstalk 101 and of chromatic aberration 102 at lens edges present in a system comprising three neighboring lens tiles 103. Each of the pincushion shapes 104 behind the lens tiles 103 illustrates the images produced by each of the lens tiles 103. The overlapping area of the images produced 104 represents the area of image crosstalk 101. The lines 102 at the edge of the pincushion shapes 104 represent the chromatic aberration 102, where each line shows a non-aligned primary color.

The shape of the image behind the lens tile, and therefore, the shape of the crosstalk present in a system, are dependent on the shape of the lens. In an embodiment, the shape of the overall coverage of the display or sensor by each square tile is a pincushion (as shown in FIG. 1), due to the common image deformation caused by any spherical lens shaved to fit into a square tile. Thus, the area of image crosstalk when viewing a system using square lens tiles, each of which is a spherical lens, is a complex shape formed of the overlapping areas of two or more pincushion shapes. As can be seen in FIG. 1, there are three overlapping pincushion shapes representing the overlapping image areas and the crosstalk and chromatic aberration present within the system when being viewed from a close viewing distance. To be clear, the image crosstalk and the chromatic aberration are two separate phenomena, but they both occur in this lens array.

Referring to FIG. 2, FIG. 200 represents an example side view of the system utilizing light-occluding barriers. In this example, the light-occluding barriers 202A and 202B are troughs filled with a light-occluding material, for example, a dark material such as epoxy. While the example of a dark material, such as epoxy, is used, any material can be utilized that provides for light occlusion. Additionally, the material may have an index of refraction that is substantially equal to or substantially matches the index of refraction of the transparent, usable area of a lens tile. In this case, substantially equal or substantially matching means an index of refraction that is as close to the index of refraction of the lens area as possible based upon manufacturing methods and/or difference in materials. In other words, the index of refraction may not be exactly matching due to differences in material and/or manufacturing capabilities.

FIG. 2 illustrates some example dimensions. However, these are merely for illustrative purposes and are not limiting. For example, the barriers could be as tall as the base 203, could have different angles, or the like. The barriers may be located at the edges of adjacent lens tiles 201A and 201B present in an array in order to create barriers to light and thus eliminate, or at least diminish, both image crosstalk and viewable chromatic aberration at the edges of the lens coverage areas. In an embodiment, a user may be viewing an image through the lens tiles 201A and 201B. The light-occluding barriers 202A and 202B block light from the display area under any given tile from being seen through a different lens tile than the one immediately situated over that area of the display. In this way the angle of view seen by each lens tile is limited, so that the ability to see light from an adjacent tile area is equally limited. Thus, little or none of the light passing through 201A is seen through 201B. In fact, the amount of light from 201A that can be seen through 201B will be a function of the viewing distance (i.e., the distance from the eye to the surface of lenses 201A and 201B) and the focal distance (the distance from the two lens surfaces to the emitting surface of the display). Also, if the area of the underlying display or sensor visible through each lens tile is actually smaller than the size of the lens tile itself (because of the space taken up by the barrier) then it may also block off the view of light through edge areas of the lens susceptible to chromatic aberration. In an embodiment, the barriers may be of any shape. In an embodiment, and used as a non-limiting example, the barriers illustrated in FIG. 2 are a triangular shape.

In an embodiment, the lens tiles of an array may fit onto a base 203 to secure the tiles in a predefined position. In an embodiment, this base may be made from a variety of translucent materials (e.g., plastics, silicone, glass, etc.) Further, in an embodiment, the orientation of the lens array is dependent on the shape and size of the base. Since the lens tiles are attached to the base, the shape and size of the base may affect how an image is seen through the lens array. For example, in an embodiment, the base may be a flat base used to orient the lens array and viewed by a user from a straight-on perspective. Additionally or alternatively, in an embodiment, the base may contain a curvature which may assist a user viewing or capturing images from an angle through the array.

In an embodiment, the light-occluding barriers may be a part of the base holding the plurality of lenses. Using the example of FIG. 2, the base may include the light-occluding material-filled troughs that make up the barriers. In an embodiment, since the base holds the lenses in a predefined shape, the barriers can be accurately located at the edges of the lens tiles. Thus, as shown in FIG. 2, each adjacent edge of a lens tile to another lens tile may be overlapped by a trough.

As discussed before, different light-occluding materials may be utilized for either the filling of troughs or the creation of the barriers, for example, epoxy, carbon, silicone, various metals, combinations of the above, or the like. The barrier material may be chosen based upon manufacturing capabilities or application requirements. The barrier material may be, in various embodiments, as dark as possible (i.e., optimally but not necessarily, black) to block as much light as possible. If the barrier material either allows some amount of light to pass or reflects some amount of light, it may also preferably feature an index of refraction as much as possible equaling that of the lenses in the array, in order to minimize crosstalk. For example, the barrier material may be doped with additives that results in a barrier material having the same, or substantially similar, index of refraction as the lens tile. In an embodiment, adjusting the index of refraction at the edge of the lens tile to closely relate to or match the index of refraction present in the center of the lens tile may assist in decreasing the crosstalk present in the lens array.

In various embodiments, the barriers may be created in a molding process when the base is created, or may be cut in the base using tools such as laser cutters. Equally the troughs may be filled in with various processes as will be familiar to those with knowledge of the art.

Figures 3A, 3B:
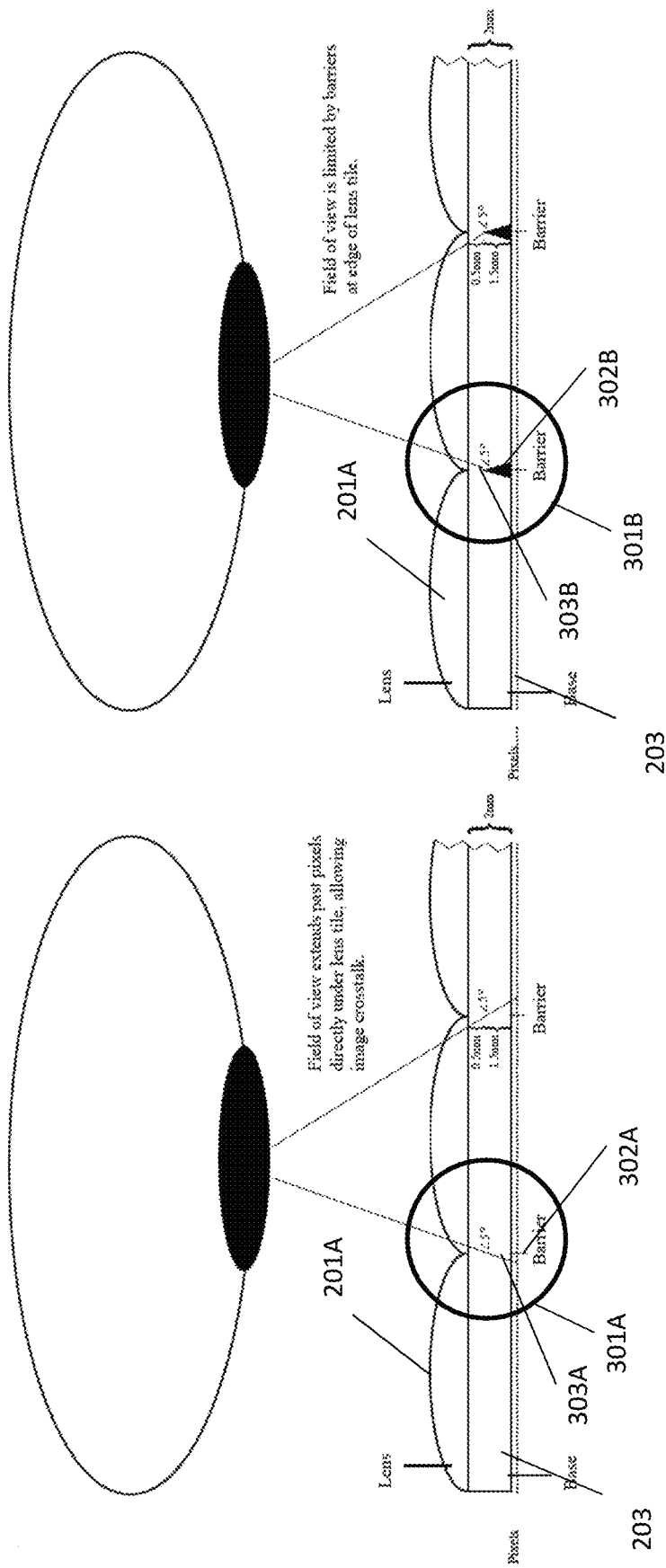
FIG. 3A illustrates an example conventional field of view.
FIG. 3B illustrates an example embodiment of the field of view with the described system implemented.

FIG. 3A and FIG. 3B illustrate the advantage of the described system over conventional systems. FIG. 3A illustrates a side view of lens tiles with no barriers when viewed in a near-eye display as found in conventional systems. The area encompassed by the circle 301A illustrates the field of view 303A in a conventional system. The line at 302A illustrates where the lens tile 201A ends. In the conventional system there are no barriers so it can be seen that the field of view 303A extends past the lens tile 201A, which results in image crosstalk.

FIG. 3B illustrates a side view of lens tiles with barriers when viewed in a near-eye display as described here throughout. The area encompassed by the circle 301B illustrates the field of view 303B in the described system. Barriers 302B are present at the end of the lens tile 201A. Thus, in the described system the field of view 303B is blocked at the edge of the lens tile 201A, which results in a reduction or full elimination of image crosstalk.

Such a system provides an apparatus for use in an image capturing or display device containing a tiled lens array to remove the presence of image crosstalk, and also areas of chromatic aberration of the edge of lens tiles, by the use of light-occluding barriers between the lens tiles. These barriers may be present in an apparatus base. The presence of barriers overlapping each internal adjacent edge between lens tiles present in the tiled lens array may provide a system with a consistently limited angle of view from each lens tile in the array and thus limited chromatic aberration and limited ability to see light from the images underlying neighboring tiles through each lens tile; in other words, a reduction or elimination of crosstalk.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. An apparatus, comprising:
    a plurality of lens tiles, wherein each of the plurality of lens tiles is shaped having flat vertical edges, and wherein the flat vertical edges allow for close grouping of adjacent of the plurality of lens tiles; and
    a base housing and positioning the plurality of lens tiles in an array configuration;
    the base comprising a plurality of light-occluding barriers, wherein each of the plurality of light-occluding barriers is located between flat vertical edges of two adjacent of the plurality of lens tiles.

2. The apparatus of claim 1, wherein each of the plurality of light-occluding barriers comprises a trough filled with a light-occluding material.

3. The apparatus of claim 1, wherein each of the plurality of light-occluding barriers comprises a material having an index of refraction substantially similar to an index of refraction of a transparent portion of the plurality of lens tiles.

4. The apparatus of claim 1, wherein each of the plurality of light-occluding barriers is located at an edge of a lens tile located adjacent to a given one or more of the plurality of light-occluding barriers.

5. The apparatus of claim 1, wherein the plurality of lens tiles are included within a plenoptic lens array.

6. The apparatus of claim 1, wherein the base comprises a translucent material.

7. The apparatus of claim 1, wherein the plurality of light-occluding barriers are located such that crosstalk between the plurality of lens tiles is reduced.

8. The apparatus of claim 1, wherein the plurality of light-occluding barriers are molded within the base.

9. The apparatus of claim 1, wherein the plurality of light-occluding barriers are cut into the base.

10. The apparatus of claim 1, wherein the plurality of light-occluding barriers result in a field of view through a given of the plurality of lens tiles small enough such that chromatic aberration at an edge of the given of the plurality of lens tiles is eliminated.

11. The apparatus of claim 1, wherein the plurality of lens tiles are arranged as a lens array.

12. An imaging system, comprising:
    at least one imaging sensor;
    at least one processor;
    a plurality of lens tiles located between the at least one imaging sensor and a display of the imaging system, wherein each of the plurality of lens tiles is shaped having flat vertical edges, and wherein the flat vertical edges allow for close grouping of adjacent of the plurality of lens tiles; and
    a base housing and positioning the plurality of lens tiles in an array configuration;
    the base comprising a plurality of light-occluding barriers, wherein each of the plurality of light-occluding barriers is located between flat vertical edges of two adjacent of the plurality of lens tiles.

13. The system of claim 12, wherein each of the plurality of light-occluding barriers comprises a trough filled with a light-occluding material.

14. The system of claim 12, wherein each of the plurality of light-occluding barriers comprises a material having an index of refraction substantially similar to an index of refraction of a transparent portion of the plurality of lens tiles.

15. The system of claim 12, wherein each of the plurality of light-occluding barriers is located at an edge of a lens tile located adjacent to a given one or more of the plurality of light-occluding barriers.

16. The system of claim 12, wherein the base comprises a translucent material.

17. The system of claim 12, wherein the plurality of light-occluding barriers are located such that crosstalk between the plurality of lens tiles is reduced.

18. The system of claim 12, wherein the plurality of light-occluding barriers are molded within the base.

19. The system of claim 12, wherein the plurality of light-occluding barriers are cut into the base.

20. The system of claim 12, wherein the plurality of light-occluding barriers result in a field of view through a given of the plurality of lens tiles small enough such that chromatic aberration at an edge of the given of the plurality of lens tiles is eliminated.

* * * * *